3,845,162
STORAGE-STABLE MOULDING AND
COATING COMPOSITIONS
Bernhard Hess and Karl Raichle, Kapellen, near Moers, Hans Rudolph, Krefeld-Bockum, and Karl Fuhr, Krefeld, Germany, assignors to Bayer Aktiengesellschaft, Leverkusen, Germany
No Drawing. Continuation-in-part of abandoned application Ser. No. 273,507, July 20, 1972. This application Aug. 15, 1973, Ser. No. 388,483
Claims priority, application Germany, July 22, 1971, P 21 36 633.6
Int. Cl. C08f 43/02, 45/58
U.S. Cl. 260—863                               13 Claims

ABSTRACT OF THE DISCLOSURE

A curable storage-stable composition comprising a mixture of a polyester having $\alpha,\beta$-unsaturated dicarboxylic acid radicals, a vinyl monomer copolymerizable with this polyester, an $\alpha$-hydroxyketone and/or benzoin ether of a primary alcohol and a dibasic acid of phosphorus having P—O—H acidity or partial esters thereof, containing at least two (P)—OH groups.

---

This is a continuation-in-part of copending application Ser. No. 273,507, filed July 20, 1972, and now abandoned.

The invention relates to the stabilization towards storage of a molding and coating composition based on a mixture of a polyester having $\alpha,\beta$-unsaturated dicarboxylic acid radicals and being stabilized in the usual manner, a copolymerizable vinyl monomer, $\alpha$-hydroxyketones and/or benzoin-ethers of primary alcohols, and at least one dibasic and/or more than dibasic acid of phosphorus having P—O—H acidity or partial esters thereof containing at least two (P)—O—H groups, as additional stabilizers.

Mixtures of polyesters having $\alpha,\beta$-unsaturated dicarboxylic acid radicals, copolymerizable vinyl monomers, $\alpha$-hydroxyketones and/or benzoin-ethers of primary alcohols are known. If aliphatic $\alpha$-hydroxyketones are used according to DAS (German Published Specification) 1,150,805, the mixtures can be cured thermally with or without the addition of peroxide, or can, in combination with compounds of vanadium, acids of phosphorus having P—O—H acidity or partial esters thereof and organic peroxides according to our copending Patent Application P 21 36 493 (Le A 13,864) be used at room temperature, whilst when aromatic substituted $\alpha$-hydroxyketones are used, such as benzoin or benzoin-ethers of primary alcohols, the mixtures can be cured by irradiation with UV-light, to give moldings of coatings.

The known mixtures mentioned above generally suffer from the disadvantage of not being sufficiently storage-stable even in the dark (DAS, i.e. German Published Specification 1,694,149).

This invention now provides a curable storage-stable composition comprising a mixture of (A) a usually stabilized polyester having $\alpha,\beta$-unsaturated dicarboxylic acid radicals;
(B) a vinyl monomer copolymerizable with the polyester;
(C) an $\alpha$-hydroxy ketone and/or a benzoin ether of a primary alcohol; and
(D) at least one at least dibasic acid of phosphorus having P—O—H acidity or partial esters thereof, containing at least two (P)—O—H groups.

The composition preferably contains 0.0005 to 1 wt. percent, more preferably 0.001 to 0.01 wt. percent of phosphorus as component D, and preferably 0.001 to 10 wt. percent, more preferably 0.005 to 3 wt. percent of component C. These percentages are by weight referred to in total composition.

The invention also provides a process for coating a substrate or a molding comprising curing the composition of the invention either as a layer on the substrate or in a mold.

The acids of phosphorus having P—O—H acidity or partial esters thereof containing at least two (P)—OH groups, used as component D function as additional stabilizers to increase the storage-stability of the compositions in the dark. Using the present invention, compositions as defined above can be formulated which possess such storage stability in the dark that they meet the requirements of industry and can be reliably processed on streamlined molding and coating installations without the danger of a premature uncontrolled polymerization.

Being metal-free compounds, the additional stabilizers described above as component D neither discolour the cured or uncured compositions, nor retard the curing, to any significant extent.

Further, the stabilizers used according to the invention remove the necessity for the component C to be stored separately from the polyester solution.

Whilst esters of phosphoric acids have already been used in polyester coating compositions combined with metal accelerators and peroxides in order to improve the colour of the cured products, the special acids of phosphorus according to the invention are new as additional stabilizers for the said mixtures.

Polyesters containing $\alpha,\beta$-unsaturated dicarboxylic acid radicals, as used in the compositions of the invention, are as usual those which are produced by polycondensation of $\alpha,\beta$-unsaturated dicarboxylic acid, for example, maleic acid, fumaric acid, mesaconic acid, itaconic acid, citraconic acid and/or dimeric (meth)acrylic acid, or their esters or anhydrides or their mixtures, with optionally unsaturated polyhydric alcohols, such as ethylene glycol, 1,2-propanediol, 1,4-butanediol, 1,4-butene-(2)-diol, 1,6-hexanediol, diethylene glycol, polyalkylene-glycol-ethers, bis-$\beta$-hydroxyalkyl-ethers of aromatic dihydroxy compounds, for example 2,2-bis(4-$\beta$-hydroxy-alkoxyphenyl)-alkanes and -cycloalkanes, xylylene glycols, 1,3-dimethylolcyclobutane, quinitol and 2,2-bis-(hydroxycyclohexyl)-alkanes and -cycloalkanes, optionally with the addition of other dicarboxylic acids, such as ophthalic acid, isophthalic acid, terephthalic acid, tetrahydrophthalic acid, hexahydrophthalic acid, tetrachlorophthalic acid, endomethylenetetrahydrophthalic acid, hexachloroendomethylenetetrahydrophthalic acid, succinic acid, glutaric acid, adipic acid and pimelic acid or monocarboxylic acids, such as acrylic acid and methacrylic acid, or other monohydric or polyhydric alcohols, such as glycerine, trimethylolethane, pentaerythritol, allyl alcohol and partial ethers of monohydric and polyhydric alcohols (compare, for example, the book by I. Björksten et al. "Polyesters and their Application," Reinhold Publishing Corporation, New York, 1956), optionally in combination with compounds which possess the allyl-ether configuration and can be built into the polyesters or be mixed into the solutions, such as, for example, $\beta,\gamma$-unsaturated alkyl ethers, such as allyl, methallyl, ethallyl, chloroallyl and crotyl ethers of the polyalcohols already mentioned, or in combination with methylol compounds which are derived from urea or melamine and are etherified with $\beta,\gamma$-unsaturated alcohols, such as methylolglyoxalureins or methylolmelamines; reaction products of polyhydric alcohols with acrolein belong to this category.

Before or after the esterification reaction by which the polyester A is produced, customary stabilizers such as phenol, guaiacol, hydroquinone, pyrocatechol, resorcinol, pyrogallol, phloroglucinol, toluhydroquinone, benzoquinone, naphthol, naphthoquinone, 2,5-di-tert.-butyl benzoquinone, chloranil, tert.-butyl pyrocatechol, and the alkyl, halogen, and nitro derivatives of said compounds can be added, in the customary amounts, to the esterification batch for stabilizing the unsaturated polyester in the usual manner.

Copolymerizable vinyl monomers are for example styrene, nuclear-substituted styrenes, divinylbenzene, acrylic and methacrylic acid or their esters or amides, esters of vinyl alcohol or allyl alcohol, and vinylketones.

A suitable component C may be any α-hydroxy-ketone, such as compounds of formula

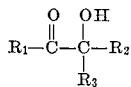

$R_1$, $R_2$ being the same or different, or forming a 5–8 membered ring together with the two C-atoms of the α-hydroxy-ketone group;

(a) $R_1$, $R_2$ representing an aliphatic radical with 1–30 C-atoms, this aliphatic radical being an alkyl group, in case substituted by one or more nitro-, hydroxy-, halogen-, amino- (in case substituted by 1–2 alkyl radicals with 1–6 C-atoms), alkoxy- (1–12 C-atoms), methoylol- and/or methylol-ether group and/or aromatic group 6–12 C-atoms);

(b) representing a cycloaliphatic radical (5–7 rings), in case substituted by one or more nitro-, hydroxy-, halogen-, amino- (in case substituted by 1–2 aliphatic radicals with 1–6 C-atoms), methylol- and/or methylol-ether-, alkyl- (1–12 C-atoms) and/or alkoxy group (1–12 C-atoms);

(c) representing an aromatic radical (1–16) C-atoms), in case substituted by aromatic radicals (1–12 C-atoms) or in case substituted by 1–4 alkyl- (1–10 C-atoms), 1–3 nitro-, 1–4 halogen-, 1–4 methylol- and/or methylolether groups, 1–4 alkoxy- (1–12 C-atoms) groups; such components D being e.g. acetol, dihydroxy acetone, benzoin, α-hydroxymethyl benzoin and nuclear-substituted benzoins, α-hydroxycyclopentanone, α-hydroxycyclohexanone.

(d) $R_3$ representing hydrogen, an alkyl group (1–12 C), a methylol or methylolether group.

A suitable component C may also be any ether of primary alcohols (the primary alcohol may contain 1–18 C-atoms) of the benzoins listed above under (c); the alcohol component of said esters may be an alkanol with 1–24 C-atoms, a cycloalkanol with 5–24 C-atoms, an aryl alcohol with 5–24 C-atoms, an aralkyl alcohol with 6–24 C-atoms and the nitro-, halogen- and alkoxy- (with 1–12 C-atoms) substituted derivatives thereof; e.g. benzoin methyl ether, -ethyl ether, -n-propyl ether and -n-butyl ether or their nuclear-substituted derivatives, such as 4,4'-dimethyl-, 4,4'-dichloro- and 4,4'-dimethoxy-benzoin ethyl ether.

Some α-hydroxy compounds are in the form of crystalline dimers which however again decompose into the monomers on fusion and can advantageously be incorporated in this form into the mixtures.

Suitable additional stabilizers for use as component D are: dibasic and/or more than dibasic acids of phosphorus having P—O—H acidity such as phosphoric acid, pyrophosphoric acid, polyphosphoric acid, phosphorous acid and the possible dibasic and/or more than dibasic partial esters of the said acids, for example the monomethyl, monoethyl, monopropyl, monoisopropyl, monobutyl, monoisobutyl, mono-oxalkyl, monohalogenalkyl, monocyclohexyl, monophenyl esters of phosphoric acid, the corresponding monoesters and/or diesters of pyrophosphoric acid and the corresponding dibasic and/or more than dibasic acidic esters of polyphosphoric acid, partial dibasic and/or more than dibasic acidic salts of the said acids and/or their esters, such as, for example, the dibasic acidic ammonium salt of a partial pyrophosphoric acid ester or the dibasic or the more than dibasic acidic ammonium salt of a partial polyphosphoric acid ester.

The molding and coating composition according to the invention most preferably contain the said additional stabilizers in amounts corresponding to about 0.002% by weight of phosphorus since at this concentration optimum storage stability is in most cases found.

The additional stabilizers are advantageously added to the polyester solutions as produced. They can however also be added at the start of the esterification by which the polyester is produced or during the manufacture of its melt; this procedure however leads to a loss in activity, which can in turn be compensated for using a correspondingly higher amount.

The storage-stable molding and coating compositions claimed can be cured thermally with or without addition of peroxide, or, in combination with compounds of vanadium, acids of phosphorus having P—O—H acidity and peroxides according to our copending Patent Application P 21 36 493 (Le A 13,864), can be cured at room temperature or, when using aromatic-substituted α-hydroxy-ketones, such as benzoin or benzoin ethers of primary alcohols, can be cured by irradiation with UV-light, without adverse discolorations which might be attributable to the additional stabilizer.

Of course, pigments, dyestuffs, fillers, glass fibres or textile fibres, agents for conferring thixotropy, UV-absorbers, waxes, paraffin, smoothing agents and levelling agents and the like can also be added to the composition.

Examples

In the examples which follow, an unsaturated polyester is used, the composition of which in parts by weight is given below. It is manufactured in a known manner by melt condensation until the viscosity and acid number mentioned below are obtained, and is dissolved in styrene to give a 65% strength solution. Before dissolving it, toluhydroquinone is added.

1. Maleic anhydride: 588 g.
2. Phthalic anhydride: 592 g.
3. 1,2-propylene glycol: 798 g.
4. Toluhydroquinone: 0.36 g.

Characteristics of the styrene solution:
   Solids content: 65%
   Viscosity (20° C.) [1]: 1,800 cp.
   Acid number: 21

[1] Measured in the falling ball viscometer according to Höppler.

In all the examples which follow, the polyester solution is mixed with the tabulated percent by weight, relative to polyester solution, of α-hydroxyketones or benzoin ethers of primary alcohols and with different amounts of the solution of additional stabilizer. The solutions of additional stabilizer contain the listed dibasic and/or more than dibasic acids of phosphorus dissolved in butyl acetate, in each case in an amount corresponding to 7% by weight of phosphorus.

Additional Stabilizer Solution:
   A: Polyphosphoric acid in butyl acetate, 7
   B: Phosphorous acid in butyl acetate, 7
   C: Phosphoric acid in butyl acetate, 7
   D: Pyrophosphoric acid in butyl acetate, 7
   E: Dibutyl pyrophosphoric acid ester in butyl acetate, 7

Comparison solutions, not claimed:
   F: Diisooctyl phosphate acid in butyl acetate, 7
   G: Dibutyl phosphite acid in butyl acetate, 7
   H: Tris-chloroethylphosphite acid in butyl acetate, 7

Determination of the storage stability in the dark 35 g. portions of the mixture are filled into 50 ml. powder jars with screw lids without gaskets, the lid is screwed on and the jar is stored in the dark at 60° C. At certain intervals of time, the jar is slightly tipped to ascertain whether the sample has gelled. The values quoted are average values of at least 3 samples.

The quantitative data given in the tables are percentages by weight relative to the polyester solution. In Table I below, various additional stabilizer solutions of the same phosphorus content (7% by weight) are compared with one another.

In the examples which follow, curing reactions are carried out which show that the additional stabilizers do not impair the curing of the mixtures.

Example 26

Manufacture of a putty by mixing the following constituents:

30.00 g. of polyester solution containing 0.1% by weight of additional stabilizer solution A
6.00 g. of styrene

TABLE 1*

| Example number | 1 | 2 | 3 | 4 | 5 | 1a | 2a | 3a | 4a |
|---|---|---|---|---|---|---|---|---|---|
| Benzoin | 1.0 | 1.0 | 1.0 | 1.0 | 1.0 | 1.0 | 1.0 | 1.0 | 1.0 |
| Additional stabilizer solution: | | | | | | | | | |
| A | 0.025 | | | | | | | | |
| B | | 0.025 | | | | | | | |
| C | | | 0.025 | | | | | | |
| D | | | | 0.025 | | | | | |
| E | | | | | 0.025 | | | | |
| Comparison solutions: | | | | | | | | | |
| F | | | | | | 0.025 | | | |
| G | | | | | | | 0.025 | | |
| H | | | | | | | | 0.025 | |
| Storage stability in the dark at 60° C. (days) | 3 | 5 | 7 | 8 | 4 | [1]2 | [1]2 | [1]2 | [1]2 |

[1] Hours.
*The amounts listed here are specified in grams.

In Table I, the Examples 1 to 5 clearly show the effect of the additional stabilizers according to the invention in comparison to Examples 1a to 4a.

In Tables II and III below, the amounts of the additional stabilizer solutions A and B are varied. The stabilizing effect manifests itself in this case particularly clearly in the optimum Examples 9 and 16, in which the storage stability in the dark at 60° C. is raised from 2 hours to 6 days.

28.70 g. of talc
1.60 g. of titanium dioxide RKB (Bayer)
28.70 g. of asbestine
4.80 g. of lithopone
0.18 g. of $\alpha$-hydroxycyclohexanone, fused
3.00 g. of methyl ethyl ketone peroxide, 50% strength The same composition as above, but with a polyester solution which does not contain any additional stabilizer,

TABLE II*

| Example | Comparison | 6 | 7 | 8 | 9 | 10 | 11 | 12 |
|---|---|---|---|---|---|---|---|---|
| Benzoin | 1.0 | 1.0 | 1.0 | 1.0 | 1.0 | 1.0 | 1.0 | 1.0 |
| Additional stabilizer solution A | None | 0.010 | 0.025 | 0.05 | 0.1 | 0.5 | 1.0 | 2.0 |
| Storage stability in the dark at 60° C. (days) | ([1])2 | ([1])5 | 3 | 5 | 6 | 5 | 3 | 2 |

[1] Hours.
*The amounts listed here are specified in grams.

TABLE III

| Example | Comparison | 13 | 14 | 15 | 16 | 17 | 18 | 19 |
|---|---|---|---|---|---|---|---|---|
| Benzoin | 1.0 | 1.0 | 1.0 | 1.0 | 1.0 | 1.0 | 1.0 | 1.0 |
| Additional stabilizer solution B | None | 0.010 | 0.015 | 0.025 | 0.05 | 0.25 | 0.5 | 2.5 |
| Storage stability in the dark at 60° C. (days) | [1]2 | [1]4 | 1 | 4 | 6 | 4 | 2 | [1]15 |

[1] Hours.

Table IV compares the stabilizing action of the additional stabilizer solution A for various mixtures containing $\alpha$-hydroxyketones or benzoin ethers of primary alcohols. Examples 23, 24 and 25 additionally contain toluhydroquinone.

is used as the comparison example. For curing, 3 g. of a solution, containing 0.5% by weight of vanadium, of $V_2O_5$ in acidic phosphoric acid mono-n-butyl ester and toluene are worked into the putties and the compositions are spread approx. 1 mm. thick onto iron sheets.

TABLE IV*

| Example number | 20 | 20a | 21 | 21a | 22 | 22a | 23 | 23a | 24 | 24a | 25 | 25a |
|---|---|---|---|---|---|---|---|---|---|---|---|---|
| Additional stabilizer solution A | 0.025 | | 0.025 | | 0.025 | | 0.025 | | 0.025 | | 0.025 | |
| Toluhydroquinone | | | | | | | 0.05 | 0.05 | 0.05 | 0.05 | 0.05 | 0.05 |
| Benzoin | 1.0 | 1.0 | | | | | | | | | | |
| Benzoin ethyl ether | | | 1.0 | 1.0 | | | | | | | | |
| Acetoin | | | | | 0.5 | 0.5 | | | | | | |
| Acetol | | | | | | | 0.5 | 0.5 | | | | |
| Dihydroxyacetone | | | | | | | | | 0.5 | 0.5 | | |
| A-Hydroxycyclohexanone | | | | | | | | | | | 1.0 | 1.0 |
| Storage stability in the dark at 60° C. (days) | 5 | [1]2 | 12 | [1]14 | 4 | [1]2 | 4 | [1]4 | 4 | [1]2 | 4 | [1]2 |

[1] Hours.
*The amounts listed here are specified in grams.

| | Additional stabilizer— | |
|---|---|---|
| | With | Without |
| Non-tacky after | 15 minutes | 15 minutes |
| Can be ground after | 30 minutes | 30 minutes |

Example 27

In the curing reaction of lacquer films shown below, the curing process is again found not to be impaired by the additional stabilizer.

Method 8.3 g. of polyester solution containing 0.1% by weight of additional stabilizer solution A, 1.7 g. of styrene, 0.2 g. of a 10% strength by weight paraffin solution in toluene (paraffin of melting point 51–53° C.) and 0.2 g. of benzoin ethyl ether are mixed in a test tube. The same mixture, with a polyester solution without additional stabilizer, serves as the comparison example. The solutions are spread as 250μ thick films on glass plates by means of a film-spreading instrument and exposed to the radiation of a fluorescent tube (Osram L lamp for copying purposes, 40 watt, 97 cm. length) at a distance of 10 cm.

| | Additional stabilizer— | |
|---|---|---|
| | With | Without |
| Paraffin floods out after | 2 minutes | 2 minutes |
| Pencil hardness after 15 minutes | >6 H | >6 H |

We claim:
1. A curable storage-stable composition comprising a mixture of
   (A) an essentially linear polyester obtained by condensation of a polyol with an acid component containing an α,β-unsaturated dicarboxylic acid or its ester or its anhydride or a mixture thereof, said polyester containing a conventional stabilizer;
   (B) a vinyl monomer copolymerizable with the polyester;
   (C) an α-hydroxy ketone or a benzoin ether of a primary alcohol; or a mixture thereof and;
   (D) at least one at least dibasic acid of phosphorus having P—OH— acidity or partial esters thereof containing at least two (P)—OH groups.

2. The composition of claim 1 which contains 0.0005 to 1 wt. percent of phosphorus as component D.

3. The composition of claim 1 which contains 0.001 to 0.01 wt. percent of phosphorus as component D.

4. The composition of claim 1 which contains 0.002 wt. percent of phosphorus as component D.

5. The composition of claim 1 which contains, as component D, phosphoric acid, pyrophosphoric acid, polyphosphoric acid, phosphorous acid, or the monomethyl, monoethyl, monopropyl, monocyclohexyl or monophenyl ester of phosphoric acid, or a corresponding monoester or diester of pyrophosphoric acid or a corresponding dibasic or more than dibasic acidic ester of polyphosphoric acid, or an acidic dibasic or more than dibasic acidic salt of one of these acids or partial esters.

6. The composition of claim 1 which contains 0.001 to 10 wt. percent of component C.

7. The composition of claim 1 which contains 0.005 to 3 wt. percent of component C.

8. The process of coating a substrate or a molding comprising curing the composition of claim 1 either as a layer on the substrate or in a mold.

9. The process of claim 8 in which the curing is induced by heat.

10. The process of claim 8 carried out without heating in the presence of a compound of vanadium, an acid of phosphorus having P—O—H acidity or a partial ester of such an acid, and a peroxide.

11. The process of claim 8 in which component C of the composition is a benzoin or a benzoinether of a primary alcohol or derivatives thereof and curing is carried out under the influence of ultraviolet light.

12. Articles having coatings manufactured by the process of claim 8.

13. Molded article manufactured by the process of claim 9.

References Cited

UNITED STATES PATENTS

| 3,031,301 | 4/1962 | Agens | 96—27 |
| 3,079,363 | 2/1963 | Koch et al. | 260—863 |
| 3,238,274 | 3/1966 | Allan | 260—863 |
| 3,582,487 | 6/1971 | Fuhr et al. | 204—159.15 |
| 3,607,693 | 9/1971 | Heine et al. | 204—159.15 |
| 3,699,022 | 10/1972 | Behrens et al. | 204—159.15 |
| 3,721,723 | 3/1973 | Heidel | 260—865 |

FOREIGN PATENTS

| 1,046,874 | 11/1953 | Germany. |
| 1,098,712 | 12/1956 | Germany. |
| 1,156,460 | 6/1969 | Great Britain. |

WILLIAM H. SHORT, Primary Examiner

E. A. NIELSEN, Assistant Examiner

U.S. Cl. X.R.

117—62; 204—159.15; 260—865

UNITED STATES PATENT OFFICE
CERTIFICATE OF CORRECTION

Patent No. 3,845,162  Dated  October 29, 1974

Inventor(s) Bernhard Hess, Karl Raichle, Hans Rudolph and Karl Fuhr

It is certified that error appears in the above-identified patent and that said Letters Patent are hereby corrected as shown below:

Col. 1, lines 4 and 5, should read -- Bernhard Hess, Kapellen near Moers, Hans Rudolph and Karl Raichle, Krefeld-Bockum and Karl Fuhr, Kre- --.

line 48, "used" should read --cured--.

Signed and sealed this 6th day of May 1975.

(SEAL)
Attest:

RUTH C. MASON
Attesting Officer

C. MARSHALL DANN
Commissioner of Patents
and Trademarks